United States Patent [19]

Harvey

[11] Patent Number: 4,655,399
[45] Date of Patent: Apr. 7, 1987

[54] IRRIGATION OR OTHER MACHINE HAVING A ROTATABLE DRUM CARRYING A HOSE OR OTHER FLEXIBLE ELEMENT WOUND THEREON

[76] Inventor: Vernon B. W. Harvey, Tanglewood, Stour Close, Little Canford, Wimborne, Dorset, Great Britain, BH21 7LU

[21] Appl. No.: 713,791

[22] Filed: Mar. 20, 1985

[30] Foreign Application Priority Data

Mar. 31, 1984 [GB] United Kingdom ............... 8408372
Nov. 28, 1984 [GB] United Kingdom ............... 8429987

[51] Int. Cl.$^4$ ........................ B05B 3/18; B65H 75/34
[52] U.S. Cl. ............................ 239/745; 137/355.21; 137/355.27; 242/75.3; 242/86.2
[58] Field of Search ................. 239/195–199; 242/75, 75.2, 75.3, 86, 86.2; 137/355.2, 355.21, 355.23, 355.26, 355.27

[56] References Cited

U.S. PATENT DOCUMENTS 3,825,197  7/1974  Sturgeon et al. ............... 242/75 X
4,266,724  5/1981  DiPalma et al. ............... 239/195
4,445,643  5/1984  Thorsby et al. ............... 239/199 X

FOREIGN PATENT DOCUMENTS 28574     5/1981  European Pat. Off. .
822803   11/1959  United Kingdom .
1048126  11/1966  United Kingdom .
1367404   9/1974  United Kingdom .

Primary Examiner—Andres Kashnikow
Attorney, Agent, or Firm—Gifford, Groh, VanOphem, Sheridan, Sprinkle and Dolgorukov

[57] ABSTRACT

A hose-drum irrigation machine having a tensioning device engaging the hose at a position adjacent the hose-guide by which the hose is pulled from the drum as the hose is being unwound or by which a drag is applied to the hose as it is being re-wound on the drum, thereby to prevent the convolutions of hose on the drum from becoming loose. The tensioning device comprises an endless belt of which one run extends lengthwise of the hose adjacent the hose-guide and frictionally engages the hose thereby to pull it from the drum where the hose is being unwound or to exert drag when the hose is being re-wound. The belt is driven in the appropriate direction by a driving sprocket driven by a motor.

7 Claims, 6 Drawing Figures

IRRIGATION OR OTHER MACHINE HAVING A ROTATABLE DRUM CARRYING A HOSE OR OTHER FLEXIBLE ELEMENT WOUND THEREON

The invention relates to a machine to be driven or otherwise propelled along the ground and carrying a rotatable drum, reel or other like carrier (hereinafter called a drum) on which a hose, cable, wire or like flexible element is wound in a plurality of side-by-side convolutions in at least one layer and from which the hose or other said flexible element can be unwound therefrom and rewound thereon.

FIELD OF THE INVENTION

The invention is particularly, but not exclusively, concerned with a hose-drum irrigation machine of the kind having a rotatably driven drum carrying a hose wound thereon in a plurality of side-by-side convolutions, in at least one layer and communicating at one end with a source of water or other liquid to be discharged through the hose while wound or partly wound on the drum and at the other end with an irrigation gun, sprinkler or other liquid discharging device.

DESCRIPTION OF THE PRIOR ART

In known hose-drum irrigation machines of this kind, the hose is wound on the drum in side-by-side convolutions in at least one layer and is unwound therefrom by a hose-laying device comprising a lead-screw driven in synchronism with the drum and having forward and reverse threads thereon and extending parallel to the axis of rotation of the hose-drum and a nut engaging the threads of the lead-screw and carrying a guide through which the hose passes, or an equivalent mechanism to provide reciprocating travel of the hose-guide, whereby as the drum is rotated, the hose-guide will be reciprocated parallel to the axis of rotation of the drum and thereby the convolutions of the hose on the drum in one or more layers will be formed thereon or removed therefrom.

It is important in such a hose-laying device that the convolutions of hose on the drum are not loose or do not become loose and therefore an object of the invention is to provide a tensioning device acting on the hose as it is unwound or re-wound on the drum.

Although the foregoing object is directed to a hose-drum irrigation machine, it may also be applied to any other machine to be driven along the ground and having a driven drum on which another flexible element, such as a cable or wire, is wound in a plurality of side-by-side convolutions in one or more layers.

SUMMARY OF THE INVENTION

According to the invention, an irrigation or other machine which is to be driven or otherwise propelled along the ground and which carries a drum, as hereinbefore defined, having a hose or other flexible element wound thereon in a plurality of side-by-side convolutions in at least one layer, includes a hose-laying device by which a hose-guide is reciprocated parallel to the axis of rotation of the drum as the drum is rotated, and a tensioning device engaging the outer surface of the hose or other flexible element at a position adjacent the hose guide, the tensioning device including driving means therefor operable to pull or to exert a drag on the hose or other flexible element as it is being unwound or re-wound and thereby to maintain the hose or other flexible element in tension and thereby to prevent the convolutions on the drum from becoming loose with respect to the drum periphery.

The driving means in the tensioning device may be a hydraulic or other fluid-operable motor or an electric motor. The drum and the lead-screw or equivalent device may also have driving means comprising a hydraulic or other fluid-operable motor or an electric motor. Where the driving means in the tensioning device and the drum driving means are both hydraulic or other fluid-operable motors they may be connected in a circuit including adjustable valve means, whereby the tensioning device motor creates a back-pressure on the drum driving motor, thereby to ensure that the latter cannot be operated until the back-pressure has been produced by the operation of the motor of the tensioning device.

The circuit may also include a valve acting across the motor of the tensioning device which is adjustable to produce a predetermined resistance when said motor is driven by the tensioning device when the drum is being driven in the winding direction.

The machine may also include switch means positioned adjacent the hose or other flexible element as it approaches the hose-guide on being re-wound or leaves the hose-guide on being unwound, whereby deviation of the hose or other flexible element from a normal position as a result of a difference between the linear velocity of the hose or other flexible element and the ground speed of the machine will stop both a motor driving the machine and a motor driving the drum.

BRIEF DESCRIPTION OF THE DRAWINGS

A hose winding and unwinding device in a hose drum irrigation machine as hereinbefore defined is now described by way of example with reference to the accompanying drawings, in which:

Referring first to FIG. 1, the hose-drum 1 is mounted for rotation on a shaft IA substantially parallel to the ground and to the longitudinal center line of a chassis, not shown, on which the hose-drum is mounted; that is the axis of rotation of the shaft extends in the direction of travel of the chassis. The shaft IA is driven through reduction gearing from a hydraulic or other fluid motor 18. The hose 25 is wound on the drum in one or more layers of side-by-side convolutions by means of a hose-laying mechanism comprising a hose-guide device 8 which travels along a reversed threaded lead-screw 5, first in one direction and then in the opposite direction. The lead-screw 5 is driven by a chain-and-sprocket drive 3,4 from a chain-driving sprocket 2 mounted on the shaft IA. Thus rotation of the hose drum in the winding or unwinding direction by the motor 18 also moves the hose-guide device 8 in one direction or the other along the lead-screw 5 and so the hose 25 is wound on or is unwound from the drum 1 progressively along the axial length of the drum in one or more layers. Such a mechanism is known in hose-drum irrigation machines. In FIG. 1 the hose 25 is connected at one end thereof remote from the machine to a fixed hydrant and supplies through the convolutions on the drum and the shaft IA which is hollow, an irrigation gun or boom, not shown, mounted on the machine.

Figure 3:
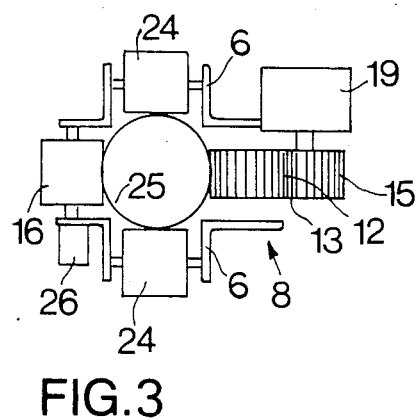
FIG. 3 is a view in the direction of arrow A in FIG. 2.

In hose-drum machines as known previously, the hose-guide device is usually in the form of a nut which travels along the lead-screw 5 and through which the hose is guided and travels with the nut in the axial direction of the lead-screw 5. The hose-guiding device 8 illustrated in FIGS. 1-3 comprises a frame 6 which includes a screw-threaded part which engages the lead-screw 5 or which is mounted on a nut engaging the lead-screw and so the hose-guiding device 8 travels bodily along the lead-screw 5. The frame 6 supports two pairs of guide rollers 24 engaging against the outside of the pipe 25 at diametrically-opposite positions and, across the diameter at 90° to the rollers 24, a further pair of guide rollers 16 and an endless friction belt 12 supported on pulleys 13 and 14. The belt 12 has external teeth thereon which are drivingly-engaged by a toothed driving pulley 15 driven by a motor 19. The hose-speed is monitored by a speed sensor 26 driven by one of the hose-engaging rollers 16 or 24 and may be compared with the ground speed of the machine or the speed of a motor driving the machine. The motor 18 and the machine-driving motor (not shown) may be fluid operable, e.g., they may be hydraulic motors. Alternatively the motors may be electrical. The drum speed and the ground speed of the machine can be maintained substantially equal and thereby permit the hose 25 to be wound onto or to be unwound from the drum at the correct tension despite changes in effective drum diameter as the layers of hose are formed or reduced and so the hose convolutions will normally tend to be held tight around the drum 1.

Figure 4:
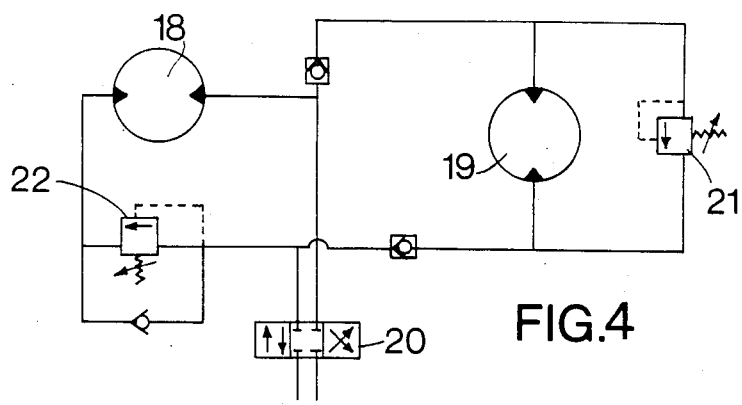
FIG. 4 is a fluid control circuit including two motors also shown in FIGS. 1–3.

In accordance with this invention, the endless friction belt 12 is provided to pull the hose from the drum 1 in the hose-unwinding sense, thereby to ensure that the convolutions remain tight on the drum. Where the drum-driving motor 18 and the belt-driving motor 19 are hydraulic or are other fluid-operable motors, they are connected in a fluid circuit shown in FIG. 4. The circuit includes an adjustable valve 22. This is set to apply a back pressure created by the motor 19 on the motor 18. The motor 18 cannot function until it has been subjected to this back pressure and so ensures that the hose is pulled from the drum 1 and the convolutions of the hose on the drum are maintained tight. The circuit also includes an adjustable valve 21 which is set to create a predetermined resistance when the motor 19 is driven by the endless belt 12 as a result of winding the hose 25 onto the drum 1 when the latter is driven in the winding direction by the motor 18. In this way a drag is imparted to the hose and the hose is maintained taut during re-winding. The grip on the hose 25 between the rollers 16 and the belt 12 is adjustable by making the rollers 16 adjustable towards and away from the pulleys 13 and 14. Instead of using the endless belt 12, the tension in the hose 25 can be produced by an equivalent roller or rollers arranged to grip the hose together with the rollers 16 and arranged to be driven by the motor 19. A proportional control valve 20 reverses the direction of rotation of the motors 18, 19.

Figure 1:
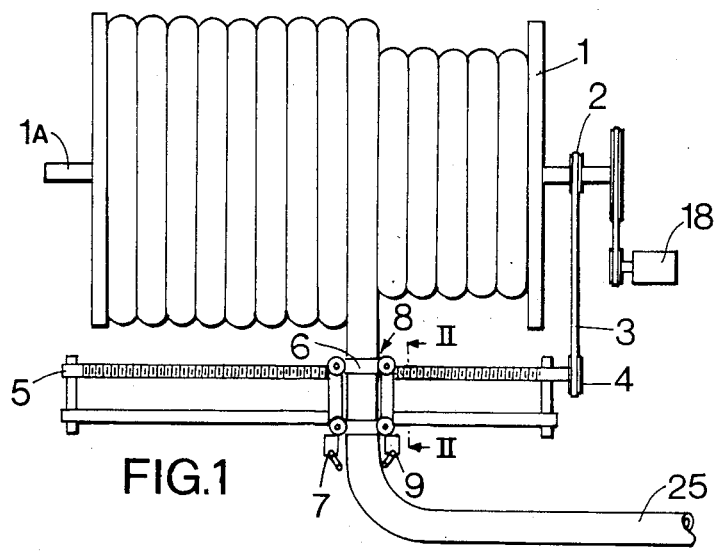
FIG. 1 is a side elevation of the hose drum and a hose-laying mechanism incorporating the hose winding and unwinding device.
Figure 2:
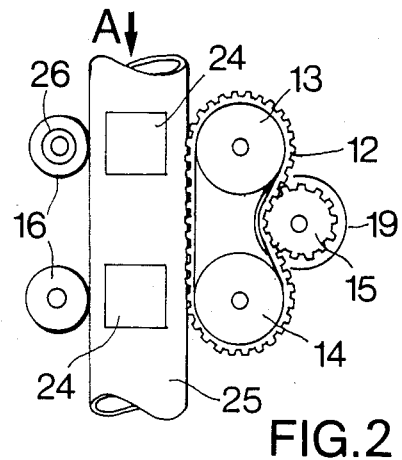
FIG. 2 is a detail view on the line II—II in FIG. 1 of part of the device shown in FIG. 1.
Figure 5:
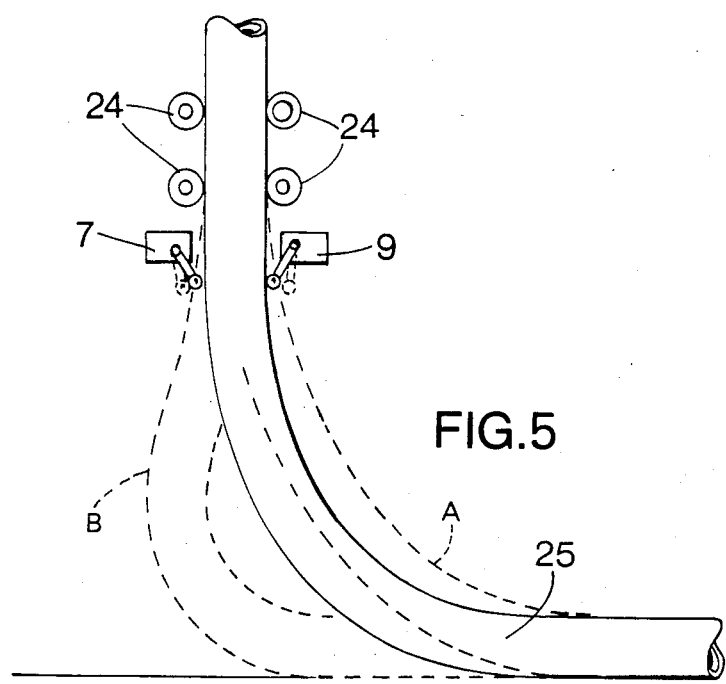
FIG. 5 is a diagram showing a pair of switches also shown in FIG. 1 for controlling the motors shown in FIG. 4 in response to deviation of a portion of the hose beneath the device as shown in FIG. 1 from a normal position during its winding or unwinding as a result of a difference in linear speed of the hose and the ground speed of the machine.
Figure 6:
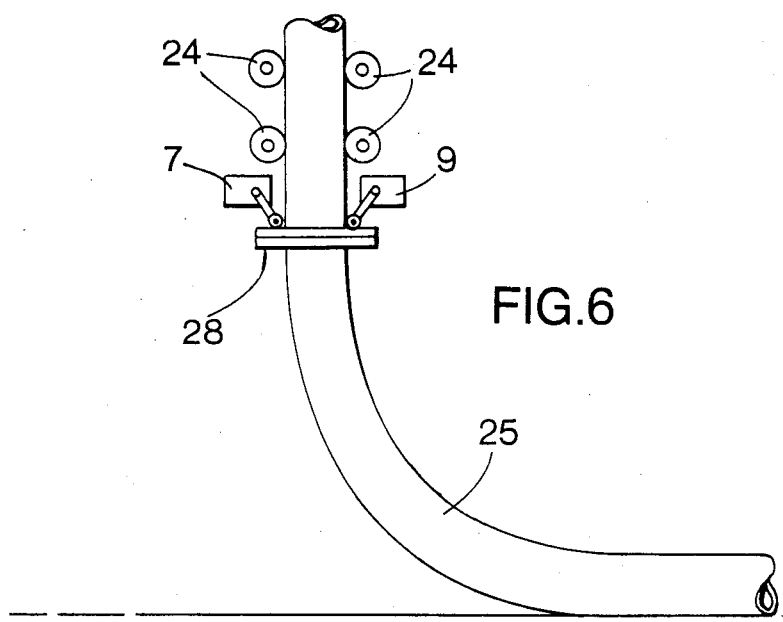
FIG. 6 is a diagram showing the use of the pair of switches shown in FIG. 1 to reverse the direction of rotation of the hose drum.

The device 8 also carries a pair of switches 7 and 9 mounted one at each side of the hose 25 as shown in FIGS. 1, 5 and 6 and having operating members engageable with the hose at a pair of diametrically-opposite positions thereon. The switches 7 and 9 which are fluid-operable or electrical operate to stop both the machine-driving motor (not shown) and the hose-drum-driving motor 18 when one or other is engaged by the hose as a result of deviation of the hose in the vicinity of the switches 7 and 9 from a normal position occupied by that part of the hose when the drum speed and ground speed are equal. The normal position of the hose 25 is indicated in FIG. 5 by full lines and in that condition neither switch 7 and 9 is engaged by the hose. Where the group speed of the machine is the datum and the drum fails to match the required speed or ceases to rotate, continuing travel of the machine will attempt to drag the hose along the ground and the hose will deviate to a position such as position A on one side or the other of the normal position, according to the direction of travel of the machine. Thus the appropriate switch 7 or 9 will shut down both the drum-driving and machine-driving motors. If the machine should stop while the drum continues to be driven, the hose will take up the position indicated at B in FIG. 5, at one side of the other, and so the switch 7 or 9, as appropriate, is operated to stop both the drum-driving and machine-driving motors. Where the drum speed is the speed datum and the ground speed of the machine fails to equal the drum speed, any deviation of the hose from its normal position to the postion shown at A or B in FIG. 5 will effect operation of the appropriate switch 7 or 9, thereby shutting down the machine.

The switches 7 and 9 therefore act as fail-safe devices which will protect the hose from damage during a machine malfunction.

The switches 7 and 9 may also be operated simultaneously to effect reversal of the hose-drum and machine-driving motors when the hose 25 has been fully re-wound onto the drum 1, by providing on the hose adjacent the hydrant a shoulder 28, which may be a pair of connecting flanges between the hose and the hydrant, engageable with the switches 7 and 9, as shown in FIG. 6.

Although the hose-laying device in the embodiment illustrated comprises a lead-screw and nut, an equivalent mechanism to provide reciprocating travel of the hose-guide as the drum is rotated may be employed.

Although the invention has been applied to a hose-drum irrigation machine it may alternatively be applied to a similar driven machine having a cable- or wire-winding drum thereon.

What I claim as my invention and desired to secure by Letters Patent of the United States is:

1. An irrigation machine which is to be driven along the ground including a drum, having a flexible hose wound thereon in a plurality of side-by-side convolutions in at least one layer, a drum-driving motor, a machine-driving motor; a hose-laying device including a hose-guide reciprocated parallel to the axis of rotation of said drum as said drum is rotated, and a tensioning device engaging the outer surface of the hose at a position adjacent said hose-guide, said tensioning device including driving means therefor operable on said hose as said drum is rotating, thereby to maintain said hose in tension and thereby to prevent the convolutions on said drum from becoming loose on said drum, said tensioning device comprising an endless belt mounted with one run thereof in frictional engagement with said hose and extending lengthwise thereof at a position adjacent said hose-guide, said driving means of said tensioning device engaging said endless belt.

2. A machine as claimed in claim 1 including switch means positioned adjacent said flexible hose as it approaches said hose-guide, whereby deviation of said flexible hose from a normal position as a result of a difference between the linear velocity of said flexible hose and the ground speed of said machine will stop both said drum-driving and said machine-driving motors.

3. An irrigation machine as claimed in claim 1 in which the endless belt has teeth on its external surface which are frictionally-engageable with the outer surface of the hose.

4. An irrigation machine which is to be driven along the ground including a drum, having a flexible hose wound thereon in a plurality of side-by-side convolutions in at least one layer, a drum-driving motor, a machine-driving motor; a hose-laying device including a hose-guide reciprocated parallel to the axis of rotation of said drum as said drum is rotated, and a tensioning device engaging the outer surface of the hose at a position adjacent said hose-guide, said tensioning device including driving means therefor operable on said hose as said drum is rotating, thereby to maintain said hose in tension and thereby to prevent the convolutions on said drum from becoming loose on said drum, said tensioning device comprising an endless belt mounted with one run thereof in frictional engagement with said hose and extending lengthwise thereof at a position adjacent said hose-guide, said driving means of said tensioning device engaging said endless belt, the irrigation machine also comprising means defining a fluid circuit; a selector valve comprising a movable selector valve member, a first inlet port to be connected to a source of pressurized fluid, a first outlet port for said fluid to be exhausted from said fluid circuit and a pair of second inlet and outlet ports for interchangeable connection in said fluid circuit by movement of said valve member, thereby to introduce said fluid to and to exhaust said fluid from said fluid circuit; a first reversible fluid-operable motor, being said drum-driving motor; a second reversible fluid-operable motor, being said driving means for said endless belt, a pair of oppositely-acting, one-way valve means positioned in said fluid circuit one at each side of said second motor and passing fluid flow between said second inlet and outlet ports of said selector valve and through said second motor only in a direction such that said second motor will tend to drive said endless belt in a direction to pull the hose from said hose-drum; a first pressure-responsive valve positioned between said selector valve and said first motor; a by-pass connected across said first pressure-responsive valve; a non-return valve in said by-pass to pass flow therethrough only in a directon such that said first motor will drive said hose-drum in a hose-winding sense, whereby on movement of the valve member of said selector valve to admit pressure fluid to said second motor, said second motor is held from operation by resistance to turning of said hose-drum until fluid pressure in said fluid circuit has been increased by back pressure from said second motor to a value at which said first pressure-responsive valve will open to pass fluid to drive said first motor and said hose-drum in a hose-unwinding sense.

5. An irrigation machine as claimed in claim 4 in which a second pressure-responsive valve is connected across said second motor, whereby on movement of the valve member of said selector valve to admit pressure fluid to said first motor to drive said first motor and said hose-drum in the hose-winding sense, said pressure fluid is prevented by said one-way valve means from flowing to said second motor, said second pressure-responsive valve opening at a predetermined pressure to drive said second motor thereby to displace fluid in a closed circuit through said second pressure-responsive valve in a direction in which said endless belt will exert a drag on said hose as said hose is being wound onto said hose-drum.

6. An irrigation machine as claimed in claim 4 in which said first pressure-responsive valve is adjustable to vary the pressure setting at which said first pressure-responsive valve will open and thereby to vary the amount of tension which will be exerted on the hose by said second motor before said first motor is driven to rotate the hose-drum in the hose unwinding sense.

7. An irrigation machine as claimed in claim 5 in which said first pressure-responsive valve is adjustable to vary the pressure setting at which said first pressure-responsive valve will open and thereby to vary the amount of tension which will be exerted on the hose by said second motor before said first motor is driven to rotate the hose-drum in the hose-unwinding sense, and in which said second pressure-responsive valve is adjustable to vary the pressure setting at which said second pressure-responsive valve will open and thereby to vary the amount of drag which will be exerted on the hose by said second motor when said first motor is driving said hose-drum in a hose-winding sense.

* * * * *